United States Patent [19]
Jennings, Jr.

[11] Patent Number: 5,123,488
[45] Date of Patent: Jun. 23, 1992

[54] METHOD FOR IMPROVED DISPLACEMENT EFFICIENCY IN HORIZONTAL WELLS DURING ENHANCED OIL RECOVERY

[75] Inventor: Alfred R. Jennings, Jr., Plano, Tex.
[73] Assignee: Mobil Oil Corporation, Fairfax, Va.
[21] Appl. No.: 719,410
[22] Filed: Jun. 24, 1991
[51] Int. Cl.$^5$ .................... E21B 43/20; E21B 43/40
[52] U.S. Cl. ................... 166/306; 166/50; 166/267
[58] Field of Search ............ 166/50, 266, 267, 273, 166/274, 306

[56] References Cited

U.S. PATENT DOCUMENTS

| | | |
|---|---|---|
| 3,118,499 | 1/1964 | Johnson et al. ............ 166/306 X |
| 3,270,809 | 9/1966 | Connally, Jr. et al. |
| 3,913,673 | 10/1975 | Barber ..................... 166/266 |
| 4,022,279 | 5/1977 | Driver ..................... 166/308 X |
| 4,034,812 | 7/1977 | Widmyer ................... 166/306 X |
| 4,410,216 | 10/1983 | Allen ...................... 166/50 X |
| 4,883,124 | 11/1989 | Jennings, Jr. .............. 166/50 X |
| 4,982,786 | 1/1991 | Jennings, Jr. .............. 166/50 |

Primary Examiner—George A. Suchfield
Attorney, Agent, or Firm—A. J. McKillop; C. J. Speciale; C. A. Malone

[57] ABSTRACT

A method to improve the displacement efficiency of hydrocarbonaceous fluids from a formation where at least two horizontal perforated wellbores are utilized. One horizontal wellbore is placed at a lower level and another is placed at a higher level in said formation. Thereafter, a first displacement liquid immiscible with and having a density greater than hydrocarbonaceous fluids in said formation is injected into said lower horizontal wellbore. Afterwards, a second hydrocarbon immiscible displacement liquid having a density greater than said first liquid is injected into said lower wellbore. The second liquid displaces said first displacement liquid and hydrocarbonaceous fluids to said higher level in the formation. Subsequently, the displacing liquids and hydrocarbonaceous fluids are produced to the surface.

7 Claims, 1 Drawing Sheet

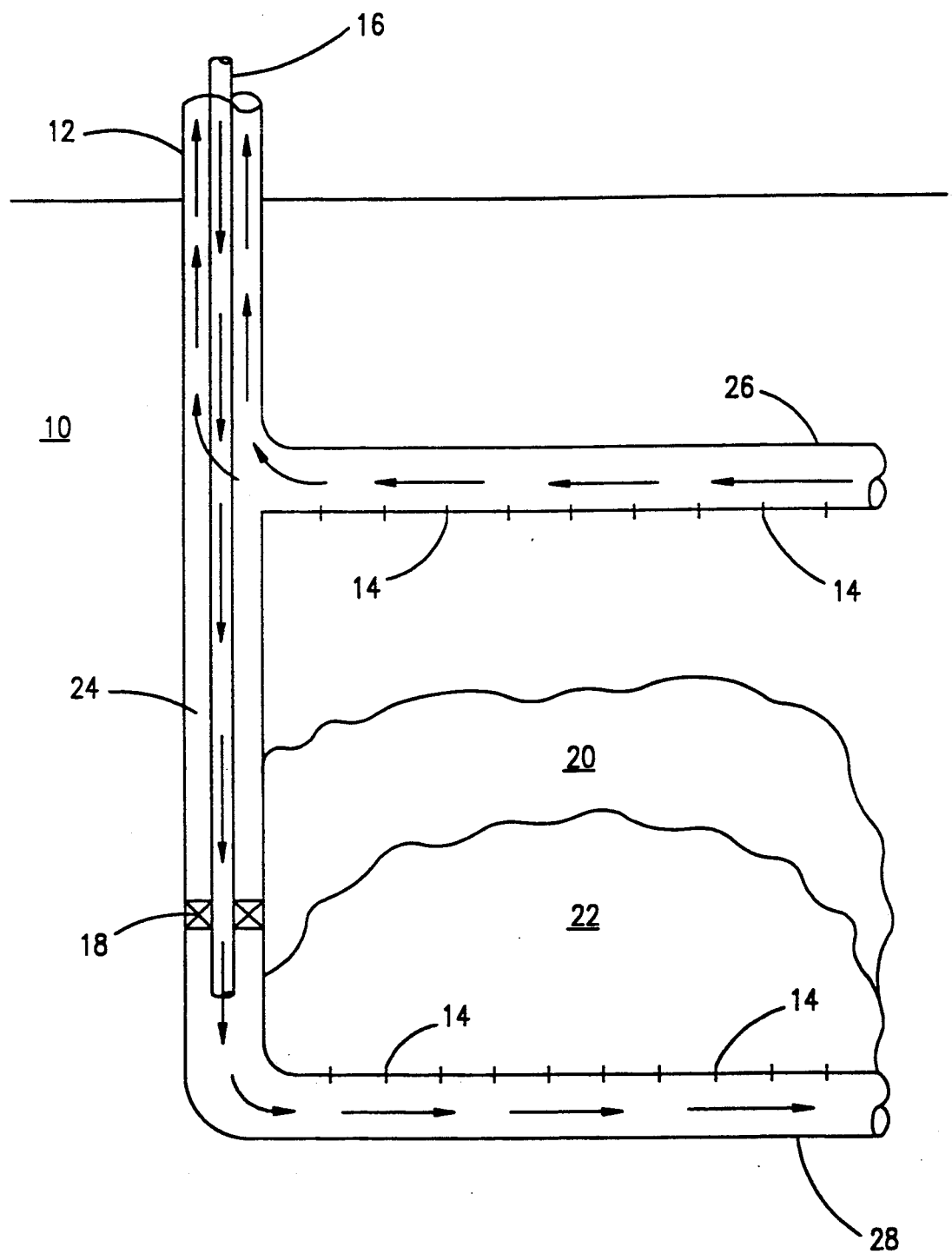

METHOD FOR IMPROVED DISPLACEMENT EFFICIENCY IN HORIZONTAL WELLS DURING ENHANCED OIL RECOVERY

FIELD OF THE INVENTION

This invention is directed to a method for improved hydrocarbonaceous fluids production via two horizontal wellbores. More particularly, it is directed to the use of different densities of displacement liquids in horizontal wellbores for removal of hydrocarbonaceous fluids from a reservoir.

BACKGROUND OF THE INVENTION

With advances in drilling technology, it is currently possible to drill horizontal wellbores deep into hydrocarbon producing reservoirs. Utilization of horizontal wellbores allows extended contact with a producing formation, thereby facilitating drainage and production of the reservoir.

Although horizontal wellbores allow more contact with the producing formation, some difficulties are encountered when horizontal wellbores are utilized which are not commonly experienced when vertical wells are used. Methods used in producing hydrocarbons from a formation or reservoir via vertical wells often prove to be inefficient when attempting to remove hydrocarbons from a reservoir where horizontal wellbores are being used. This inefficiency results in utilization of increased amounts of fluids used during enhanced oil recovery operations. This results in a diminution in the amount of hydrocarbons removed from the formation or reservoir.

Therefore, what is needed is a method for improved displacement efficiency in horizontal wellbores during enhanced oil recovery operations.

SUMMARY

This invention is directed to a method for improved displacement efficiency where two horizontal wells are used to remove hydrocarbonaceous fluids from a formation oil reservoir. In the practice of this invention, a first liquid immiscible with hydrocarbonaceous fluids contained in the formation is injected into a lower horizontal well. This first liquid has a specific gravity greater than that of the hydrocarbonaceous fluids which causes the hydrocarbonaceous fluids to be displaced upwardly in the formation. Thereafter, a second liquid having a specific gravity greater than the first liquid is injected into a lower horizontal well. This causes the first liquid and hydrocarbonaceous fluids to be displaced upwardly toward a second horizontal well. Thereafter, hydrocarbonaceous fluids are removed from the formation by the upper horizontal well. Hydrocarbonaceous fluids and displacing liquids are subsequently separated and the liquids are recycled to produce additional hydrocarbonaceous fluids from the formation.

It is therefore an object of this invention to improve the displacement of hydrocarbonaceous fluids from a formation in a more efficient manner.

It is another object of this invention to use displacement liquids which are relatively low in cost to remove hydrocarbonaceous fluids from a formation.

It is still yet another object of this invention to remove increased amounts of hydrocarbonaceous fluids from a formation via two horizontal wellbores.

BRIEF DESCRIPTION OF THE DRAWINGS

The drawing is a schematic representation showing displacement of hydrocarbonaceous fluids with variable density fluids.

DESCRIPTION OF THE PREFERRED EMBODIMENTS

In the practice of this invention, a liquid having a specific gravity greater than hydrocarbonaceous fluids contained in formation 10 is injected into a lower horizontal wellbore 28 by injection tubing 16. Injection tubing 16 is positioned in the vertical section of wellbore 12 by packer 18. As the first displacing liquid proceeds into lower horizontal wellbore 28, it enters formation 10 via perforations 14 contained in the lower horizontal wellbore. As the first liquid of greater density than the hydrocarbonaceous fluids enters the formation it proceeds in an upward manner toward upper horizontal wellbore 26. As the first liquid 20 proceeds upwardly in formation 10, it displaces hydrocarbonaceous fluids before it toward wellbore 26. Subsequently, a second liquid having a density greater than the first displacing liquid is injected into wellbore 12 via tubing 16 whereupon it again enters lower horizontal wellbore 28. The second displacing liquid 22 proceeds from horizontal wellbore 28 into formation 10 where it displaces first displacing liquid 20 upwardly toward second horizontal wellbore 26.

The second displacing liquid is continually injected into lower horizontal wellbore 28 until it causes first displacing liquid 20 and hydrocarbonaceous fluids to be directed into horizontal upper wellbore 26 via perforations 14. Hydrocarbonaceous fluids and displacing liquids exit upper horizontal wellbore 26 into vertical wellbore 12 via annulus 24. These hydrocarbonaceous fluids and displacing liquids are produced to the surface where they are subsequently stored and separated. The hydrocarbonaceous fluids and displacing liquids are separated from each other. After separation, the displacing liquids are recycled back into formation 10 to remove additional hydrocarbonaceous fluids from the formation.

Although two horizontal wellbores are utilized in this embodiment of the invention, more than two horizontal wellbores can be utilized at different levels in the formation as will be understood by those skilled in the art. As will be understood by those skilled in the art, various combinations of interconnected horizontal wellbores can be used in combination with a single vertical wellbore to obtain the removal of hydrocarbonaceous fluids from the formation. A combination of horizontal wellbores which can be used is disclosed in U.S. Pat. No. 4,982,786 which issued to Jennings, Jr. on Jan. 8, 1991. This patent is hereby incorporated by reference herein.

Displacing liquids which can be used herein, include seawater, brackish water, brine solutions, and mixtures thereof. Listed below are some minimum required high and low density specific gravity solutions which can be used as the displacement liquids or fluids. The second displacement liquid should have a specific gravity of at least 0.1 greater than the specific gravity of the first displacement liquid. Although sodium chloride, potassium chloride, calcium chloride, and zinc chloride are mentioned in Table 1 below, bromides of these salts may also be utilized. Salt solutions having a lower density than the second liquid can be used as a first displacement liquid. When used in this manner, the second higher density displacement fluid or liquid should have a specific gravity of from about 1.1 to about 1.96 at room temperature.

In a preferred embodiment of this invention, hydrocarbonaceous fluids in the formation will have a specific gravity of about 0.85. The first displacement liquid, comprised of a brine solution, will have a specific gravity of about 0.95. After injecting this first displacement liquid into the lower horizontal wellbore, a second displacement liquid, comprised of a brine solution, will have a specific gravity of about 1.05. This second displacement liquid is injected into the lower horizontal wellbore which causes the first displacement liquid and hydrocarbonaceous fluids to flow upwardly into the first horizontal wellbore. Subsequently, the hydrocarbonaceous fluids and displacement liquids are produced to the surface via the upper horizontal wellbore.

As will be understood by those skilled in the art, the specific gravity of the first displacement liquid will depend on the specific gravity of the hydrocarbonaceous fluids present in the formation of interest.

TABLE I

Examples of High Density Fluids

| Fluid | Concentration By Weight (%) | Specific Gravity @ 20° C. | Density Pounds Per Gallon @ 20° C. |
|---|---|---|---|
| NaCl | 2 | 1.0144 | 8.45 |
| NaCl | 4 | 1.0292 | 8.57 |
| NaCl | 8 | 1.0590 | 8.82 |
| NaCl | 12 | 1.0894 | 9.07 |
| NaCl | 26 (sat.) | 1.2025 | 10.02 |
| KCl | 2 | 1.0110 | 8.42 |
| KCl | 4 | 1.0239 | 8.53 |
| KCl | 8 | 1.0500 | 8.75 |
| KCl | 12 | 1.0768 | 8.97 |
| KCl | 24 (sat.) | 1.1623 | 9.68 |
| $CaCl_2$ | 2 | 1.0148 | 8.45 |
| $CaCl_2$ | 4 | 1.0316 | 8.59 |
| $CaCl_2$ | 8 | 1.0659 | 8.88 |
| $CaCl_2$ | 12 | 1.1015 | 9.18 |
| $CaCl_2$ | 40 (sat.) | 1.3957 | 11.63 |
| $ZnCl_2$ | 2 | 1.0167 | 8.47 |
| $ZnCl_2$ | 4 | 1.0350 | 8.62 |
| $ZnCl_2$ | 8 | 1.0715 | 8.93 |
| $ZnCl_2$ | 12 | 1.1085 | 9.23 |
| $ZnCl_2$ | 70 (sat.) | 1.9620 | 16.34 |

Once a cycle of a first displacement liquid and a second displacement liquid has been moved through the formation so as to obtain hydrocarbonaceous fluids therefrom, the cycle can be repeated until it becomes uneconomical to remove additional hydrocarbonaceous fluids from the formation. A miscible displacement procedure using a water bank is disclosed in U.S. Pat. No. 3,270,809 which issued to Conally, Jr. et al. on Sep. 6, 1966. This patent is hereby incorporated by reference herein in its entirety. The teachings of these procedures can be used in combination with this invention to place the displacement fluids into the formation. Of course, as disclosed herein, horizontal wellbores must be used as taught along with the displacement liquid.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:

1. A method for improved displacement efficiency in horizontal wells during an enhanced oil recovery operation in a formation or reservoir comprising:
   a) injecting into a lower horizontal well penetrating said formation a first liquid immiscible with the formation's hydrocarbonaceous fluids where said liquid has a specific gravity greater than said hydrocarbonaceous fluids thereby causing upward fluid displacement in the formation;
   b) injecting into said lower well a second liquid having a specific gravity greater than the first liquid thereby displacing said first liquid and hydrocarbonaceous fluids upwardly toward a second horizontal well; and
   c) removing hydrocarbonaceous fluids from said formation.

2. The method as recited in claim 1 where said first liquid comprises sea water, brackish water, brine solutions, and mixtures thereof.

3. The method as recited in claim 1 where said first liquid is a member selected from the group consisting of aqueous solutions of potassium chloride, sodium chloride, calcium chloride, zinc bromide, potassium bromide, sodium bromide, calcium bromide, zinc bromide, and mixtures thereof.

4. The method as recited in claim 1 where said first liquid has a specific gravity range of from about 0.95 to about 1.20 at room temperature.

5. The method as recited in claim 1 where said second liquid has a specific gravity of at least 0.1 greater than the specific gravity of the first liquid.

6. The method as recited in claim 1 where the steps are repeated until the desired quantity of hydrocarbonaceous fluids has been removed from the formation.

7. The method as recited in claim 1 where the hydrocarbonaceous fluids and liquids produced from the formation are separated and the liquids are recycled to recover additional hydrocarbonaceous fluids.

* * * * *